(12) United States Patent
Parks (10) Patent No.: US 10,730,663 B2
(45) Date of Patent: Aug. 4, 2020

(54) MIXER FOR A SPORTS AND WATER BOTTLE

(71) Applicant: Richard Lynn Parks, Ontario, CA (US)

(72) Inventor: Richard Lynn Parks, Ontario, CA (US)

(\*) Notice: Subject to any disclaimer, the term of this patent is extended or adjusted under 35 U.S.C. 154(b) by 0 days.

(21) Appl. No.: 16/444,324

(22) Filed: Jun. 18, 2019

(65) Prior Publication Data

US 2019/0308775 A1  Oct. 10, 2019

Related U.S. Application Data (63) Continuation-in-part of application No. PCT/US2019/016556, filed on Feb. 4, 2019.

(60) Provisional application No. 62/626,320, filed on Feb. 5, 2018, provisional application No. 62/658,300, filed on Apr. 16, 2018, provisional application No. 62/685,226, filed on Jun. 14, 2018.

(51) Int. Cl.
  *B01F 13/00* (2006.01)
  *B65D 23/04* (2006.01)
  *B01F 15/00* (2006.01)
  *A47J 43/27* (2006.01)

(52) U.S. Cl.
  CPC .............. *B65D 23/04* (2013.01); *A47J 43/27* (2013.01); *B01F 13/002* (2013.01); *B01F 15/00512* (2013.01)

(58) Field of Classification Search
  CPC ...................................................... B01F 13/005
  USPC .................................................. 366/130, 308
  See application file for complete search history.

(56) References Cited

U.S. PATENT DOCUMENTS

| | | | | |
|---|---|---|---|---|
| 459,668 | A * | 9/1891 | Wood ..................... | B01F 13/002 366/343 |
| 2,258,174 | A * | 10/1941 | Chawner ............... | B08B 9/0552 15/104.061 |
| 2,859,020 | A * | 11/1958 | Eddy .................... | A47J 43/0465 366/274 |
| 4,640,623 | A * | 2/1987 | Tornell .................. | B01F 13/002 222/394 |
| 5,544,960 | A | 8/1996 | Sommovigo et al. | |
| 5,681,606 | A | 10/1997 | Hutchison et al. | |
| 6,379,032 | B1 * | 4/2002 | Sorensen .............. | B01F 13/002 366/130 |
| 7,441,941 | B2 | 10/2008 | Vernon | |
| D687,259 | S | 8/2013 | Hauser et al. | |
| D776,482 | S * | 1/2017 | Lin ................................ | D7/376 |

(Continued)

*Primary Examiner* — David L Sorkin
(74) *Attorney, Agent, or Firm* — Kirk A. Buhler; Buhler & Associates Patenting (57) ABSTRACT

Improvements in an agitator is disclosed. The agitator has a central body with sides that have blades that flex or bend inward upon insertion and then expand once the pass through the neck of the bottle. The side are elongated and allows the mixer to have an orientation within the bottle. The orientation allows for a buoyancy of the mixer to break-up powder or fruit that typically floats on the surface of the liquid. The side elements can cut into fruit and pulverize power to blend the ingredient(s). A carrier or case for the mixer provides a container for the mixer to dry and further collects and water from the mixer. A removal hook allows a user to snag one of the ends or a side element. The side flexing elements of the mixer will bend inward to pass the mixer out the neck of the bottle.

18 Claims, 7 Drawing Sheets

(56) References Cited

U.S. PATENT DOCUMENTS

| | | |
|---|---|---|
| 9,706,880 B1 | 7/2017 | Kalamaras |
| 9,723,956 B2 | 8/2017 | Arnold, III |
| 9,949,592 B2 | 4/2018 | Dayton |
| 2006/0250887 A1 | 11/2006 | Vernon |
| 2013/0201783 A1 | 8/2013 | Stewart |
| 2014/0119154 A1 | 5/2014 | Kershaw |
| 2014/0233344 A1 | 8/2014 | Aliberti |
| 2014/0340979 A1 | 11/2014 | Keel, III |
| 2015/0290605 A1 | 10/2015 | Dayton |
| 2017/0105581 A1 | 4/2017 | Enghard |

\* cited by examiner

MIXER FOR A SPORTS AND WATER BOTTLE

CROSS REFERENCE TO RELATED APPLICATIONS

This application claims the benefit International application PCT/US19/16556 filed Feb. 4, 2019 that claims the benefit of provisional application Ser. No. 62/685,226 filed Jun. 14, 2018, provisional application Ser. No. 62/658,300 filed April 16 and provisional application Ser. No. 62/626,320 filed Feb. 5, 2018 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an agitator for mixing sports drinks. More particularly, the present mixer for a sports or water bottle is a deformable shape that deforms upon insertion into a water bottle. After mixing or agitation a hook is inserted into the bottle and the agitator is deformed as it is drawn out of the bottle.

Description of Related Art Including Information Disclosed Under 37 CFR 1.97 and 1.98

The use of common water bottles and sports or water bottle have become more popular a people begin to use a greater amount of bottles water and bring along water or other drinks when they exercise or a away from a water source. Often these people will add other powders fruits or other ingredients to the water or drink. These added powders or ingredients must be mixed to blend with the fluid. Simply shacking the bottle will often not liquify the powders into the fluid and many berry or fruit additives require some pulverization to expel flavor and pulp into the liquid.

A number of patents and or publications have been made to address these issues. Exemplary examples of patents and or publication that try to address this/these problem(s) are identified and discussed below.

U.S. Pat. No. 7,441,941 issued on Oct. 28, 2008 to Robert D. Vernon is entitled Shaker with Reciprocating Agitator. This patent discloses a handheld shaker with a reciprocating agitator, comprising a mixing vessel that operatively contains a guide rod that runs from one end of the vessel to an opposite end of the vessel. The shaker also uses a hollow agitator frame that operatively reciprocates from the one end of the vessel to the opposite end, and thereby mixes fluid contained within the vessel. This patent requires a large opening so the agitator can be removed for cleaning.

U.S. Pat. No. 9,723,956 issued on Aug. 8, 2017 to is entitled Device, arrangement and method for texturizing and aerating drinks. This patent discloses an arrangement for shaking drinks includes a shaking container and a device placed in a drink in the container. The device texturizes and aerates the drink when the container is shaken. The device has a three-dimensional body constituted of a food-grade, thermally insulating, elastomeric material and is re-usable. The container also requires a large opening for insertion and removal of the device.

U.S Publication number US20140340979 was published on Nov. 20, 2014 to Hubert Richard Keel, III and is entitled Agitator, System, and Method for Using the Same. This publication discloses an agitator, comprising a body having a central axis and an asymmetric weight distribution; and a plurality of spines, each spine having a shaft and a termination, wherein the shaft smoothly transitions from the body; wherein the body and spines are adapted to enhance mixing when the agitator is shaken in a vessel containing a powder and a liquid medium. The agitator must be inserted through the large cup opening.

U.S Publication number 20140233344 was published on Aug. 21, 2014 to David A. Aliberti and is entitled Drink mixer bottle and agitator. This publication discloses a shaker including a vessel and an agitator. The vessel includes a container wall. A rounded bottom closes off the container wall, wherein a border of the bottom is formed radially towards a center axis of the vessel such that the bottom transitions from the container wall to be outwardly domed. This publication also does not have elements that distort to fit through the opening and could not be placed through a small bottle opening.

What is needed is a mixer for a sports or water bottle that can be inserted and withdrawn from a common water or sports battle and can be withdrawn from the bottle. The mixer should also be packaged to include a serving of powder that can be added to the bottle. The proposed mixer for a sport bottle provides the solution.

BRIEF SUMMARY OF THE INVENTION

It is an object of the mixer for a sports or water bottle to have a central body with side elements that flex to allow the mixer to fit within a common bottle opening. Because most openings in bottled water are fairly small an agitator or mixer must be distorted to enter the opening and then expand once inside. This is best accomplished with two or more flexing blades that flex or bend inward upon insertion and then expand once the pass through the neck of the bottle.

It is an object of the mixer for a sports or water bottle for the mixer to have and elongated football shape. The elongated shape allows the mixer to have an orientation within the bottle. The orientation allows for a buoyancy to orient the mixer to break-up powder or fruit that typically floats on the surface of the liquid. The side elements can cut into fruit and pulverize power to blend the ingredient(s). The elongated football shape can rub along the side walls of a bottle to enhance blending and agitation.

It is another object of the mixer for a sports or water bottle to include an optional weight. The weight provides both an increased mass to crush fruits and can be used to alter the total density of the mixer to allow the mixer to sink further into the liquid. This also can help to keep the mixer in a desired orientation for future removal of the mixer from the bottle without the need to shake an empty bottle.

It is another object of the mixer for a sports or water bottle to include a carrier or case for the mixer. The carrier provides a container for the mixer to dry and further collects and water from the mixer. The carrier may further include an area for one or more servings of powdered energy mix and may further include an area for other tools or accessories. Other accessories can be a knife or other object to open, cut fruit or remove the outer skin.

It is still another object of the mixer for a sports or water bottle for the case to include a removal hook. The removal hook allows a user to insert the hook into the bottle and snag one of the ends or a side element. The side flexing elements of the mixer will bend inward to pass the mixer out the neck of the bottle. Once secured the mixer is withdrawn from the bottle where the mixer can be washed to remove any fluids or residue. The removal hook can also be washed along with the carrier to clean the components.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description | | | | | |
|---|---|---|---|---|---|
| 18 | agitator | 19 | agitator | 19A | swirling agitator |
| 20 | agitator shell | 21-28 | blade(s) | 30-33 | loop |
| 34, 35 | tab(s) | 36 | | 37 | hinge |
| 38 | outer loop | 39 | elliptical hole | 40-45 | hole(s) |
| 46, 47 | tab(s) | 48 | hinge | 49 | solid core |
| 50 | ballast | 51-54 | depression | 55 | partial tab |
| 56 | full tab | 57 | flat end | 60 | first half |
| 61 | second half | 65, 66 | blade(s) | 70 | outside diameter |
| 71 | compressed | 80 | ball diameter | | |
| 81 | pill | 82 | powder recess | 83 | funnel |
| 84 | Tab | 88 | loop | 89 | frame |
| 90 | lower half | 91 | upper half | 92 | cap |
| 93 | threads | 94 | loop | 95 | shaft |
| 96 | hook | 97 | agitator recess | 100 | bottle |
| 101 | push | 102 | fold | 103 | shake |
| 104 | neck opening | 120 | bottom cup portion | 121 | lid portion |
| 122 | cap portion | | | | |

Figure 1:
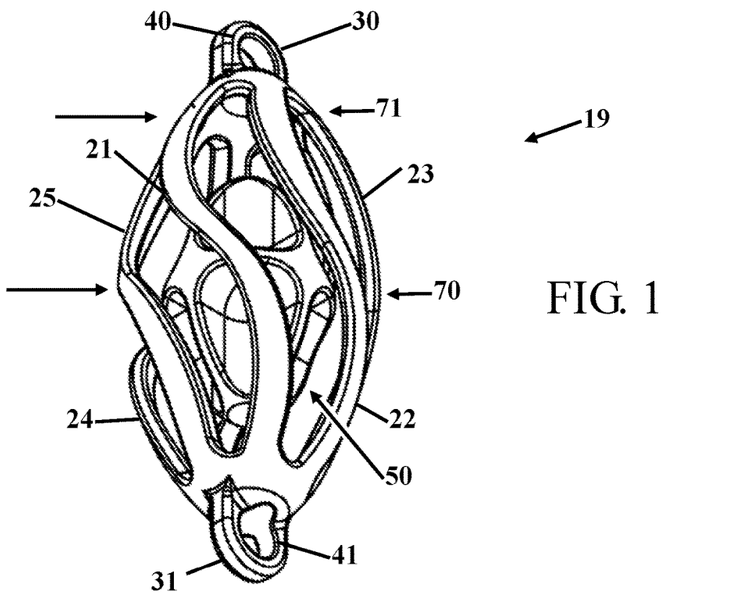
FIG. 1 shows a mixer for a sports or water bottle in a first preferred embodiment with an internal ballast.

FIG. 1 shows a mixer agitator 19 for a sports or water bottle in a first preferred embodiment with internal ballast 50. This embodiment of the agitator 19 is constructed with spiral blades 21, 22, 23, 24 and 25. The spiral blades operate to mix powdered additives in a bottle. Depending upon the direction of rotation of the agitator 19, the agitator 19 can be driven deeper into a fluid or can be driven to the top of a fluid within a bottle. The driving direction is based upon the rotation as a propeller in fluid or air. The blades can also provide a chopping force to break fruits, such as berries, to distribute flavor and pulp into the fluid. The cross-section of the blades can further be adjusted to create a sharp leading edge and can drive fluids into or out of the center of the agitator 19. In this figure ballast 50 is inserted into the agitator 19. The blast can alter the buoyancy of the agitator 19 to make the agitator 19 float higher in a fluid or sink into the fluid, or bottom, of a container. The outside diameter 70 of the agitator 19 is larger than the opening of a common water bottle.

To insert the agitator 19 into a common water bottle, the spiral blades 21, 22, 23, 24 and 25 flex as the agitator 19 is pushed through the opening of a common bottle. While the agitator 19 is configured to fit into a common water bottle, the agitator 19 can be used in a class, cup or other container to mix powder or fruits. The material of the ballast 50 is selected to allow at least a portion of said mixer agitator 20 to float above a top surface of a body of water. While an ideal density can be about 0.8 to 1.5 other densities are contemplated that are greater or less than 1.0 depending upon the desired floating or sinking that is desired from the assembly of the ballast 50 and the mixer agitator 20.

Each end of the agitator 19 has a loop 30 and 31 with holes 40 and 41 respectively. To extract the agitator 19, a hook or other item is inserted through the neck of a common bottle and the hook is engaged into a hole 40 or 41, whereby the agitator 19 can be drawn out through the water bottle opening for washing or cleaning of the agitator 19. The ballast 50 can be removed from the agitator 19 by pushing the ballast 50 out through the blades where the ballast can be separately cleaned.

While removal of the agitator 19 is described with the use of a hook, it is also contemplated that the agitator 19 can be removed by inverting the bottle and imparting a jolt to the container, whereby the agitator 19 deforms and passes through the bottle opening.

Figure 2:
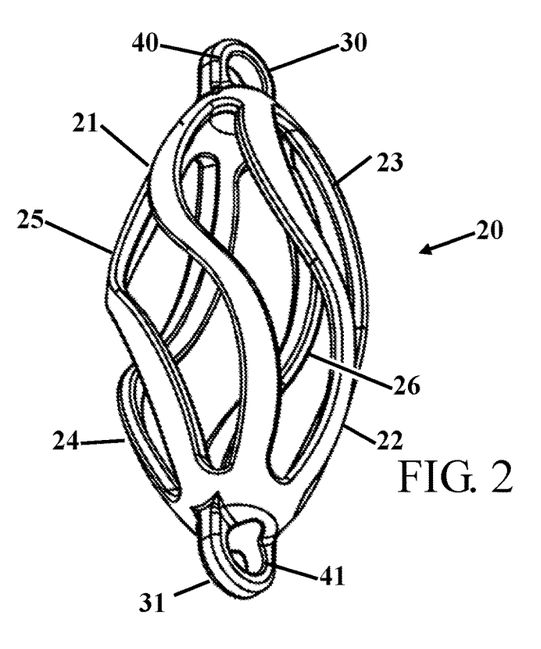
FIG. 2 shows a mixer for a sports or water bottle in the first preferred embodiment without the internal ballast.

FIG. 2 shows a mixer agitator 20 for a sports or water bottle in the first preferred embodiment without the internal ballast. The use or need of the ballast can be individually determined based upon the needs of the user and the material being mixed. Without the ballast fluids can more easily flow through the agitator 20. In this figure all six blades 21, 22, 23, 24, 25 and 26 are shown in a spiral manner. While six blades are shown, as few as three to many more than six blades are contemplated. The minimum of three blades provides a balanced center of rotation. It is further contemplated that a single blade or two blades can be used where the blade(s) spiral or curve to retain symmetry around a center of rotation. The material of the mixer agitator 20 is selected to allow at least a portion of said mixer agitator 20 to float above a top surface of a body of water. While an ideal density can be about 0.5 to 0.9 other densities are contemplated that are greater or less than 1.0.

The loops 30 and 31 remain at the elongated ends of the agitator 20 along with the holes 30 and 31 to allow for removal of the agitator 20 through the neck and end opening of a common bottle. While a common bottle is discussed, the bottle can be any water, energy, carbonated, non-carbonated, energy or otherwise enhanced bottle with a consumption opening or neck that is larger in diameter than the outside diameter of the agitator 20.

Figure 3:
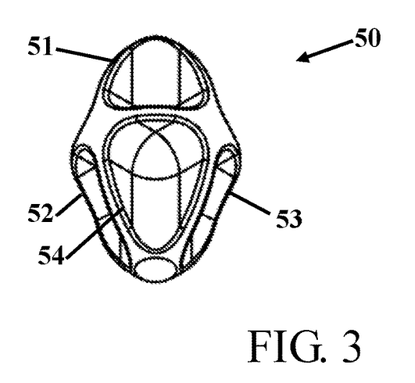
FIG. 3 shows the internal ballast.

FIG. 3 shows the internal ballast 50. As previously discussed, the internal ballast 50 can be optionally used depending upon the requirements or desire of the user. The internal ballast 50 can be as simple as a sphere or a cube to a more complex shape as shown in this figure. The internal ballast 50 shown here has a plurality of depressions 51, 52, 53 and 54 that increase the mixing and agitation as liquids, solids, powders and semi-solids flow in, around and through the agitator. The shape shown here is also an elongated shape that retains its orientation within the agitator. A round or other shape can be configured to freely rotate in all three directions of rotation within an agitator frame.

Figure 4:
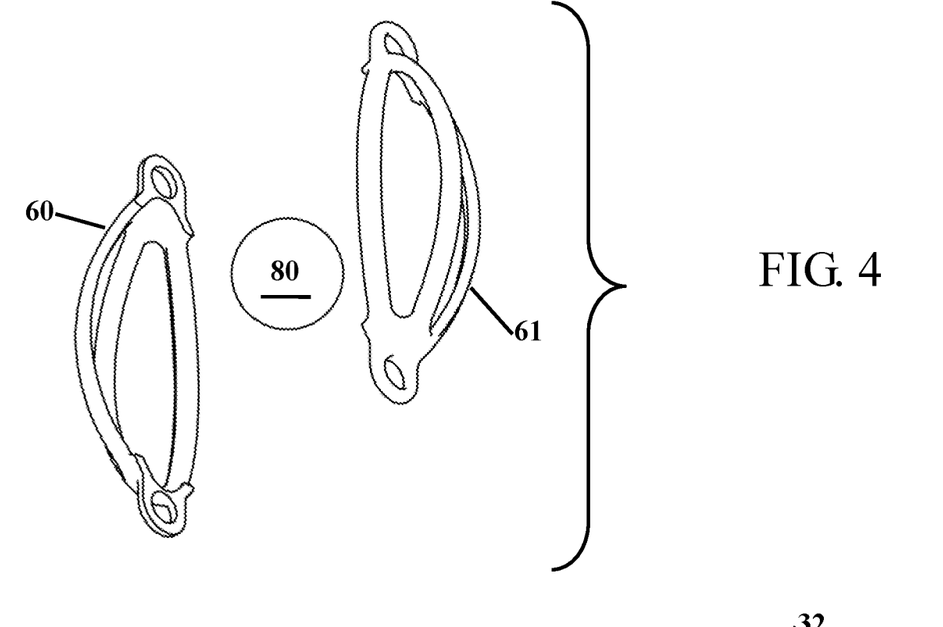
FIG. 4 shows an exploded view of the mixer for a sports or water bottle in a second preferred embodiment.
Figure 5:
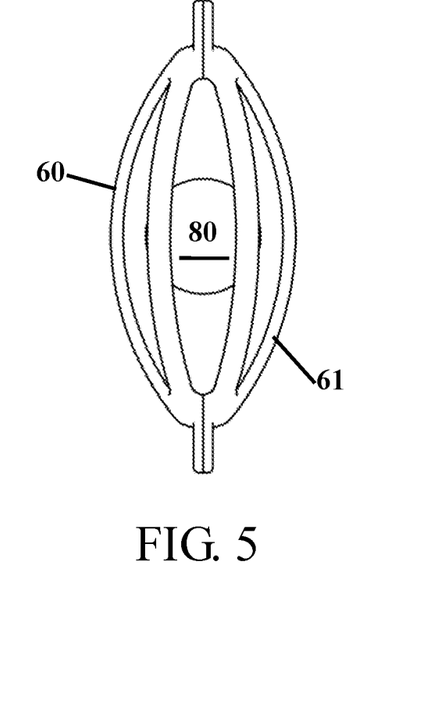
FIG. 5 shows an assembled view of the mixer for a sports or water bottle in the second preferred embodiment with a ballast.
Figure 6:
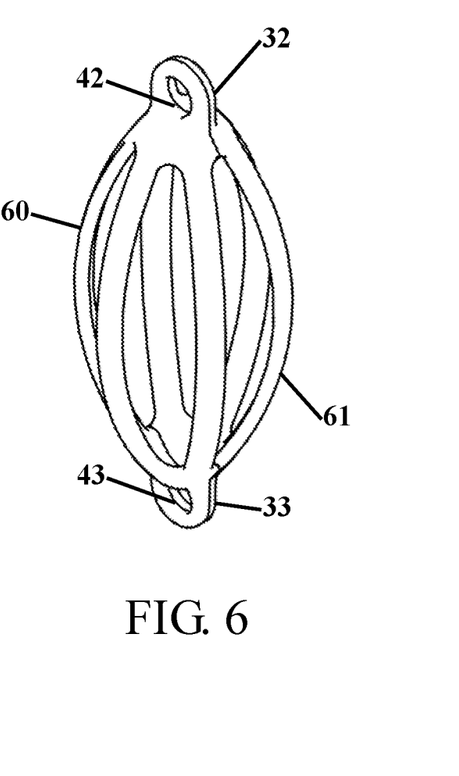
FIG. 6 shows an assembled view of the mixer for a sports or water bottle in the second preferred embodiment without a ballast.

FIG. 4 shows an exploded view of the mixer for a sports or water bottle in a second preferred embodiment, FIG. 5 shows an assembled view of the mixer for a sports or water bottle in the second preferred embodiment with a ballast and FIG. 6 shows an assembled view of the mixer for a sports or water bottle in the second preferred embodiment without a ballast. This configuration of an agitator has essentially six blades formed from two halves 60 and 61 with each half having three blades each. The ballast in this embodiment is a round ball 80 that can freely move within the agitator. The blades are essentially linear as they extend from the two loops 32 and 33. Each of the two loops has holes 42 and 43 that extend through the two halves 60 and 61. The holes allow for the agitator to be hooked and pulled through the opening of the bottle. In this embodiment the halves 60 and 61 can be separated and the ball removed so the agitator can be used with or without the ball 80 or ballast. While the ball 80 is shown as a round ball, the ball can take a variety of shapes as shown in other figures herein. The ball 80 can have different buoyancy from the agitator frame to allow the ball to float at the top of the agitator or sink to the bottom of the agitator.

FIG. 6B shows a one-piece folded embodiment without end holes that hinges 48 from the bottom and the top has a tab 84 that secures into the elliptical hole 39 at the top of the mixer. In this embodiment the mixer can be opened for complete cleaning of all of the surfaces.

Figures 7, 8:
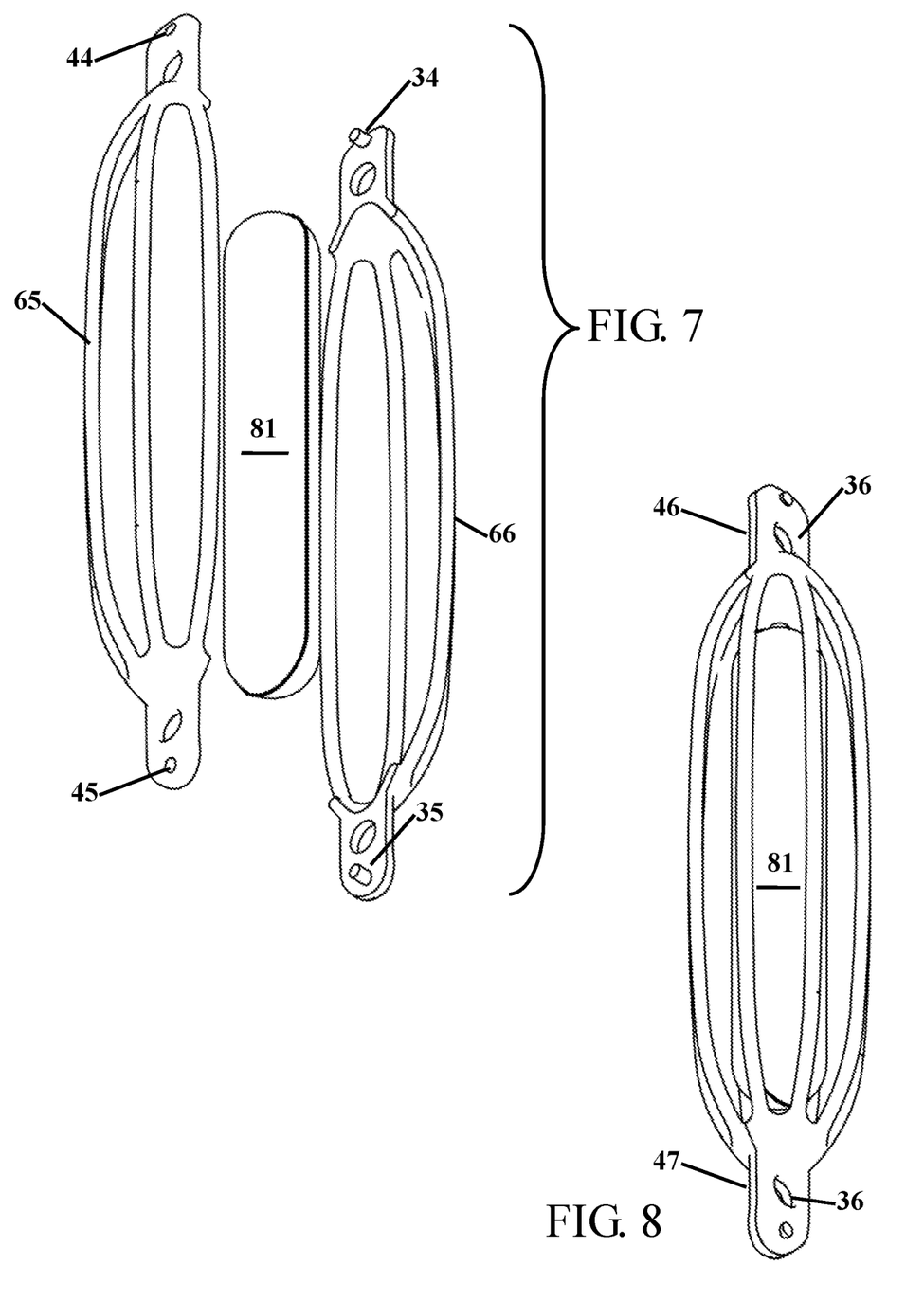
FIG. 7 shows an exploded view of the mixer for a sports or water bottle in a third preferred embodiment.
FIG. 8 shows an assembled view of the mixer for a sports or water bottle in the third preferred embodiment with a ballast.

FIG. 7 shows an exploded view of the mixer for sports or water bottle in a third preferred embodiment, FIG. 8 shows an assembled view of the mixer for a sports or water bottle in the third preferred embodiment with ballast. This configuration of an agitator also has six blades formed from two halves 65 and 66 with each half having three blades each. The ballast in this embodiment is an elongated round cylinder 81 that can freely move up and down within the agitator. The blades are essentially linear as they extend from the two tabs 34 and 35. Each of the two loops has holes 46 and 47 that extend through the two halves 65 and 66. The holes allow for the agitator to be hooked and pulled through the opening of the bottle. In this embodiment the halves 65 and 66 can be separated and the ball removed so the agitator can be used with or without the elongated rounded cylinder 81 or ballast.

While the ballast 81 is shown as an elongated rounded cylinder, but the cylinder can take a variety of shapes as shown in other figures herein. The elongated rounded cylinder 81 can have different buoyancy from the agitator frame to allow the ballast to float at the top of the agitator or sink to the bottom of the agitator. This figure also shows tabs 34 and 35 that fit and locate into holes 44 and 45 that retain the two halves together and allow the two halves 65 and 66 to be more easily separated.

Figure 9:
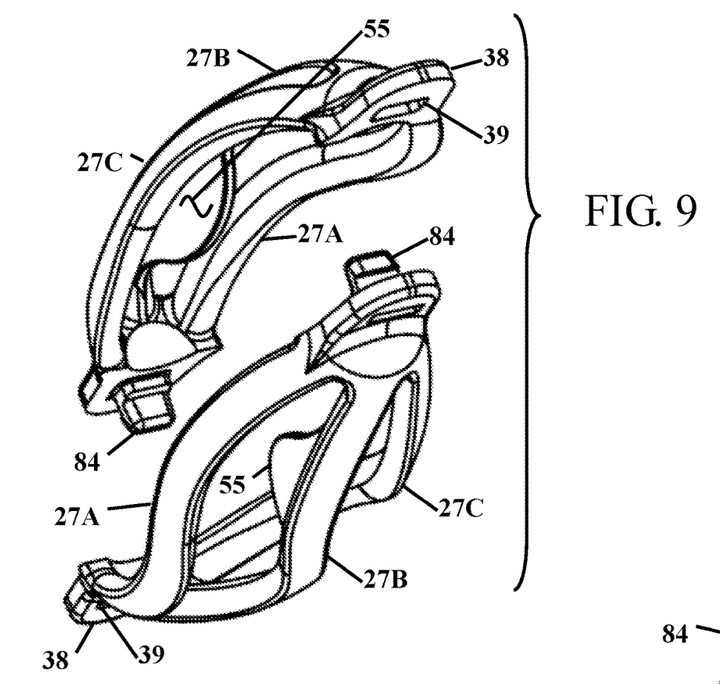
FIG. 9 shows an exploded view of the mixer for a sports or water bottle in a fourth preferred embodiment.
Figure 10:
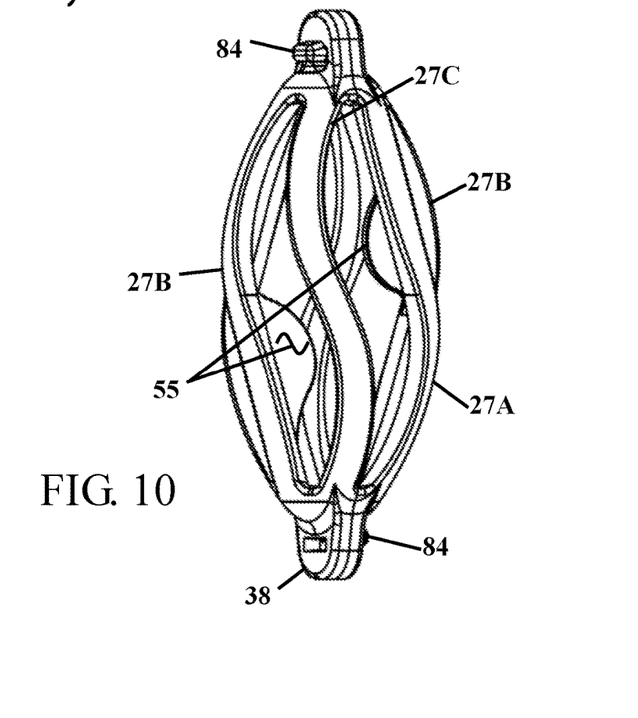
FIG. 10 shows an assembled view of the mixer for a sports or water bottle in the fourth preferred embodiment with a ballast.

FIG. 9 shows an exploded view of the mixer for sports or water bottle in a fourth preferred embodiment and FIG. 10 shows an assembled view of the mixer for a sports or water bottle in the fourth preferred embodiment. In this embodiment the halves of the mixer are the same and one is "flipped" to engage in the other half. Each half has three blades 27A, 27B and 27C. At the first end is an outer loop 38 with an elliptical hole 39. The elliptical hole 39 allows for receiving a tab 84 that locks into the elliptical hole 39. The tabs 84 in elliptical hole 39 allow the two halves to be retained together. Inside of the mixer is a partial tab 55 that extends from one of the blades 27B to enhance mixing of fluids and powders. While only one partial tab 55 is shown the tab 55 can extend from more than one blade.

Figure 11A:
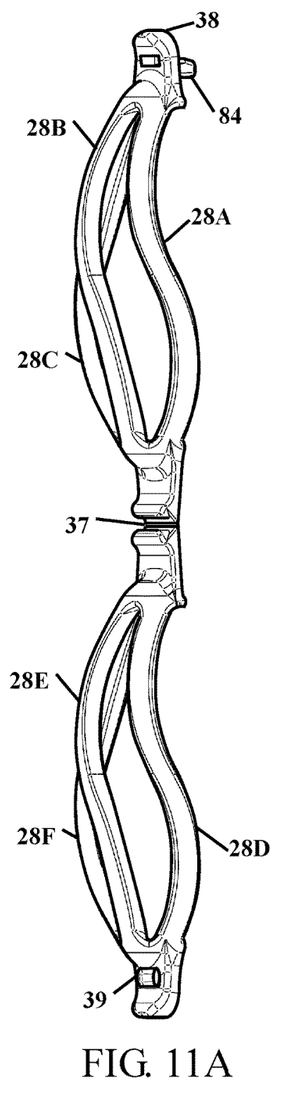
FIG. 11A shows a version of the mixer for a sports or water bottle with a hinge.
Figure 11B:
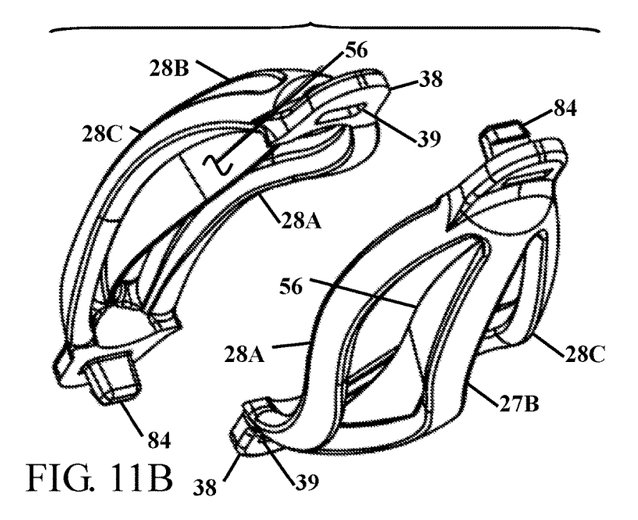
FIG. 11B shows an exploded view of the mixer for a sports or water bottle in a fifth preferred embodiment.
Figure 12:
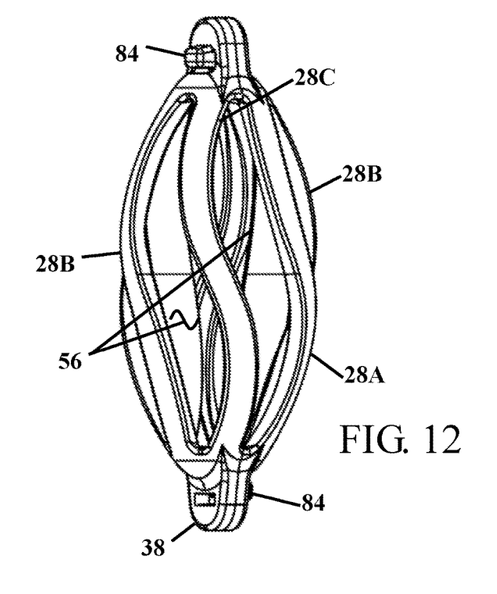
FIG. 12 shows an assembled view of the mixer for a sports or water bottle in the fifth preferred embodiment with a ballast.

FIG. 11A shows a version of the mixer for a sports or water bottle with a hinge, FIG. 11B shows an exploded view of the mixer for sports or water bottle in a fifth preferred embodiment and FIG. 12 shows an assembled view of the mixer for a sports or water bottle in the fifth preferred embodiment. In the embodiment shown in FIG. 11B the halves of the mixer are the same and one is "flipped" to engage in the other half. Each half has three blades 28A, 28B and 28C. In the embodiment shown in FIG. 11B the mixer for sports or water bottle is molded as a single part with a hinge 37 between the two halves. This allows the mixer for sports or water bottle to be completely opened and closed and "snapped" together with the hook in the tab 84 engaged in the hole 39. To open the mixer for sports or water bottle the tab is depressed to remove the tab 84 from the hole 39 to open the mixer for sports or water bottle.

At the first end is an outer loop 38 with an elliptical hole 39. The elliptical hole 39 allows for receiving a tab 84 that locks into the elliptical hole 39. The tabs 84 in elliptical hole 39 allow the two halves to be retained together. Inside of the mixer is a tab 56 extends along the inside of one 28B to enhance mixing of fluids and powders. While only one tab 56 is shown the tab 56 can extend from more than one blade.

Figure 13:
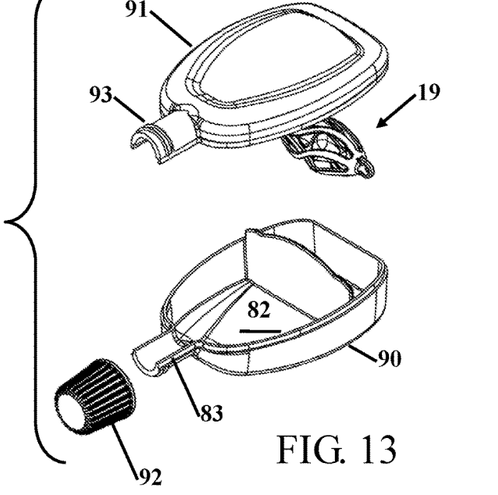
FIG. 13 shows an exploded view of a housing for the mixer.

FIG. 13 shows an exploded view of housing for the mixer agitator 19. The housing is shown in a particular configuration, but other configurations and shapes are contemplated. In this configuration of housing, the housing has a top 91 and bottom housing 90. The container has a neck with threads 93 for a cap that secures the two halves together. There is an area in the housing for storage of the agitator 19. There is further a separate container for storage of a powdered energy, or a dissolvable pill. The neck is formed as a funnel 83 to allow powder within the powder recess 82 to pour into the opening of a common water bottle. There is further an area for a removal hook to remove the agitator 19 from a bottle. The container can have additional storage areas and can include a location for a knife or other tools to open a skinned fruit like a grape, for example. This allows a person to prepare a mixture before they travel to a gym and then disperse the mixture into water or an energy drink.

Figure 14:
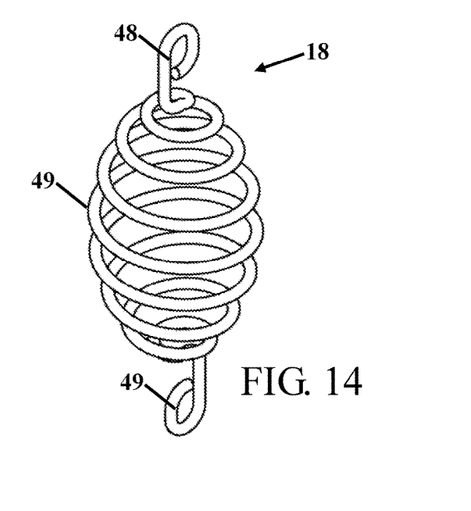
FIG. 14 show an agitator configured in an elongated spiral wound embodiment.

FIG. 14 show an agitator 18 configured in an elongated spiral wound embodiment. In this embodiment the wound frame 89 terminates on both ends with a loop 88. The center of the body is larger in diameter than the inside diameter of a recyclable water bottle. The spiral nature of this configuration flexes to compress and fit into the recyclable water bottle. After use, either loop 88 can be captured to pull the agitator 18 back through the opening of the recyclable water bottle. The loop ends also are users to screw or unscrew the wire frame 89 agitator 18 from into or out of a container. The agitator 18 is preferably made from stainless steel or other spring material but could be made from non-metallic materials.

Figure 15:
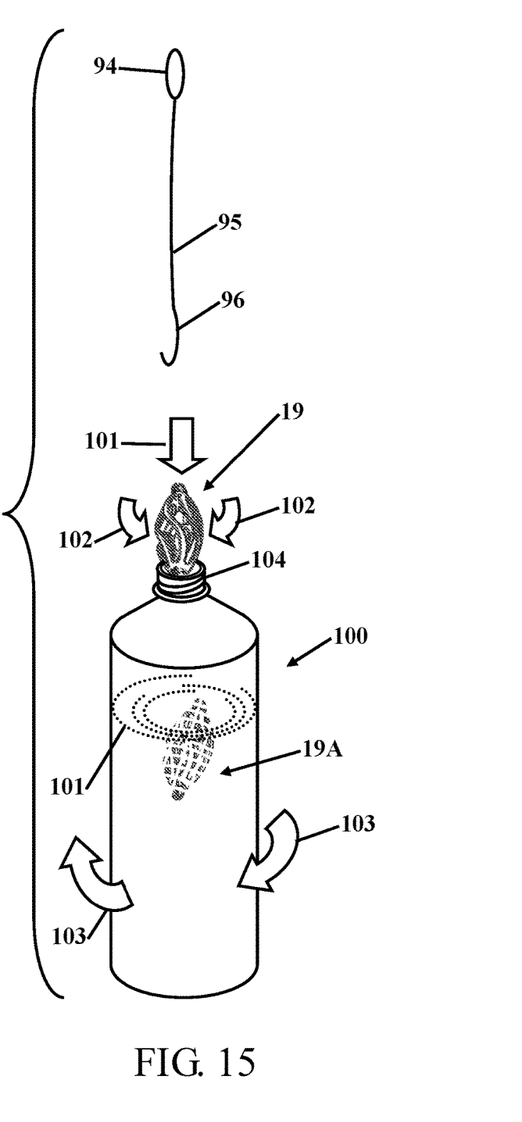
FIG. 15 shows insertion and use of the agitator with a bottle.

FIG. 15 shows insertion and use of the agitator with a bottle 100. The agitator 19 is shown larger than the diameter of the neck opening 104 of the bottle 100. The agitator 19 is pushed 101 into the opening of the bottle and the side blades of the agitator 19 are pushed inward 102 to allow the agitator 19 to enter into the bottle 100. Powder or other additives can be placed into the bottle 100 before or after the agitator 19. The bottle 100 is rotated, swirled or shaken 102 to produce a swirl 101 of the fluid within the bottle 100. The motion drives the agitator 19A against the walls of the bottle and makes the agitator 19A spin. Powder or other ingredients within the bottle 100 are mixed, blended or chopped to make a more homogeneous mixture with the bottle. Removal of the agitator 19A is with a hook 96 on a shaft 95 with an end, shown here with a loop 94 that can also be used to retrieve an agitator/blender. The hook 96 is inserted in into the neck opening and the hook 96 engages into a hole in the agitator 19A, or around a blade of the agitator 19A. The agitator 19A can then be pulled through the neck opening 104 for removal/cleaning or can be stored in the container for future cleaning.

Figure 16:
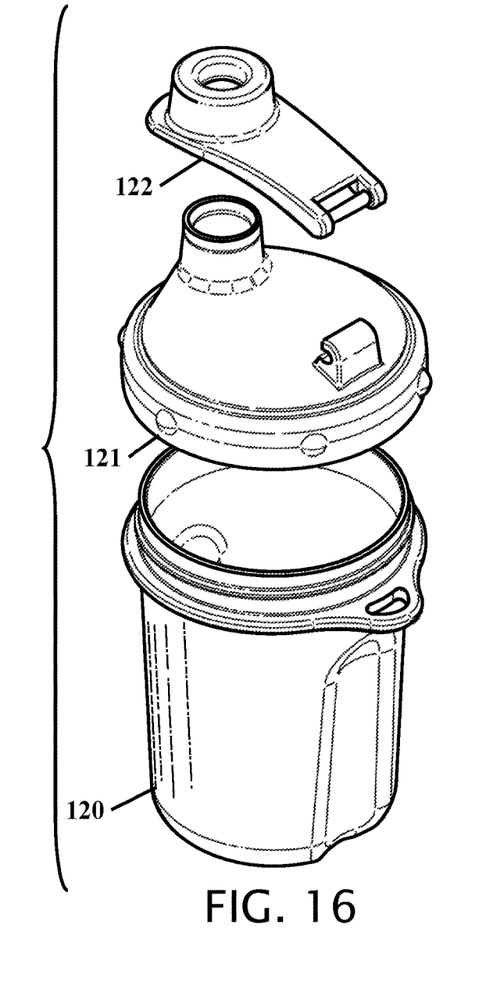
FIG. 16 shows an exploded view of a shaker cup.
Figure 17:
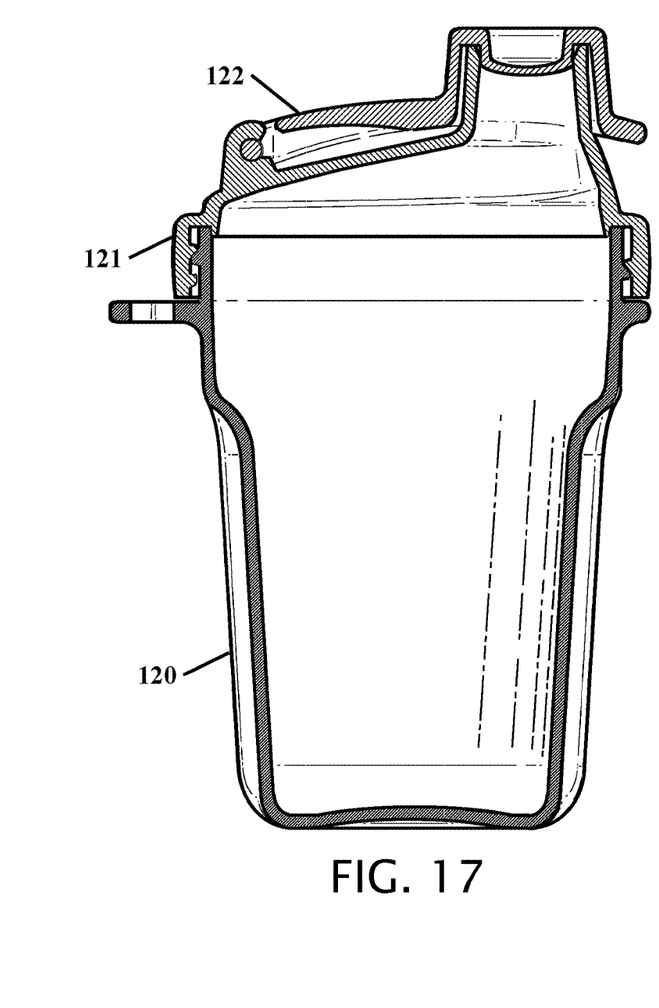
FIG. 17 shows a sectional view of the shaker cup from FIG. 16.

FIG. 16 shows an exploded view of a shaker cup and FIG. 17 shows a sectional view of the shaker cup from FIG. 16. The shaker cup includes a bottom cup portion 120, a lid portion 121 that surrounds a threaded, bayonet or snap on the bottom cup portion 120. An opening on the lid portion 121 accepts an operable cap portion 122.

Thus, specific embodiments of a mixer for a sports or water bottle have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A mixer and bottle comprising:
an elongated body;
said elongated body being formed from a folded hinged body wherein each half of said folded hinged body has a plurality of blades that extend from said fold;
a first half of said elongated body having a hole at a first end and a second half of said elongated body having a tab wherein when said elongated body is folded said tab engages in said hole;
a bottle having a narrow neck;
said plurality of blades having a first diameter and are configured to flex inward whereby reducing said first diameter to a second diameter that is smaller than said narrow neck whereby enabling said plurality of blades to flex inward as said elongated body passes through said narrow neck of said bottle and said plurality of blades expand within said bottle;
said first diameter is less than an inside diameter of said bottle, and
said elongated body is configured to freely rotate within said bottle when rotational motion is imparted on fluids within said bottle.

2. The mixer and bottle according to claim 1, wherein said tab is removable from said hole for cleaning.

3. The mixer and bottle according to claim 1, wherein said folded hinged body has a hollow interior.

4. The mixer and bottle according to claim 1, wherein said elongated body includes at least one hole on a tab that extends from one or both ends of said elongated body.

5. The mixer and water bottle according to claim 4, wherein said at least one hole is configured to allow a removable hook to engage into said at least one hole to remove said elongated body through said neck of said bottle.

6. The mixer and bottle according to claim 1, further includes a hook on an elongated shaft.

7. The mixer and bottle according to claim 6, wherein said hook is configured to removably engage on said elongated body whereby said blades flex inward to withdraw said elongated body from said bottle.

8. The mixer and bottle according to claim 1, wherein at least one of said blades has a rib that extends inward or outward of a blade on said elongated body.

9. The mixer and bottle according to claim 1, wherein rotation of said elongated body within said bottle blends and or pulverizes powders, solids, fruit and semi-solids within said bottle.

10. The mixer and bottle according to claim 1, further includes a housing that is separate from said bottle for storage of said elongated body within said housing.

11. The mixer and bottle according to claim 10, wherein said housing further includes a storage area for a serving of a dry powder for use in said bottle.

12. The mixer and bottle according to claim 10, wherein said housing has a pouring funnel for said dry powder.

13. The mixer and bottle according to claim 1, wherein said elongated body is unfolded for cleaning.

14. The mixer and bottle according to claim 1, wherein said elongated body has at least four blades.

15. The mixer and bottle according to claim 1, wherein said elongated body further includes a ballast that is unrestrained from movement within said elongated body.

16. The mixer and bottle according to claim 15, wherein said ballast has a density that allows at least a portion of said elongated body to float above a top of a water level.

17. The mixer and bottle according to claim 1, wherein said plurality of blades are configured in a spiraled or curved configuration that extends between said elongated ends.

18. The mixer and bottle according to claim 1, wherein said bottle is a user supplied bottle that has a dispensing opening that is narrower than an outside diameter of said plurality of blades.

* * * * *